(12) United States Patent
O'Connor et al.

(10) Patent No.: US 11,566,741 B2
(45) Date of Patent: Jan. 31, 2023

(54) ADJUSTABLE MULTI-PORT CONNECTOR AND VALVE

(71) Applicant: Swan Products, LLC, Sandy Springs, GA (US)

(72) Inventors: Timothy J. O'Connor, Eden, NY (US); Erick Williams, Roswell, GA (US)

(73) Assignee: Swan Products, LLC, Sandy Springs, GA (US)

( * ) Notice: Subject to any disclaimer, the term of this patent is extended or adjusted under 35 U.S.C. 154(b) by 0 days.

(21) Appl. No.: 16/869,843

(22) Filed: May 8, 2020

(65) Prior Publication Data
US 2020/0263820 A1    Aug. 20, 2020

Related U.S. Application Data

(63) Continuation of application No. 15/909,349, filed on Mar. 1, 2018, now abandoned.

(51) Int. Cl.
*F16L 47/18* (2006.01)
*F16L 47/28* (2006.01)
(Continued)

(52) U.S. Cl.
CPC .......... *F16L 47/285* (2013.01); *F16K 5/0421* (2013.01); *F16K 11/20* (2013.01);
(Continued)

(58) Field of Classification Search
CPC ..... F16L 41/03; F16L 29/002; F16L 27/0816; F16L 27/0841; F16L 47/285;
(Continued)

(56) References Cited

U.S. PATENT DOCUMENTS 212,611 A ‡ 2/1879 Linnell ...................... A01J 5/12
    137/103
1,099,713 A ‡ 6/1914 Morris ..................... F16K 11/22
    137/883

(Continued)

FOREIGN PATENT DOCUMENTS

EP          0400897 A1 ‡ 12/1990  ................ F17C 5/06
WO    WO-2007/132996 A1 ‡ 11/2007  .......... F16L 27/0816

OTHER PUBLICATIONS

Partial European Search Report in related EP19160015.4 dated Jul. 9, 2019.‡

*Primary Examiner* — Matthew W Jellett
*Assistant Examiner* — Christopher D Ballman
(74) *Attorney, Agent, or Firm* — Polsinelli, P.C.

(57) ABSTRACT

A multi-fitting rotatable fluid connection apparatus comprising a fluid entry fitting and first and second fluid discharge fittings. The fluid entry fitting comprises a first end connector threaded for attachment to a fluid source, and first and second distribution connectors. The first fluid discharge fitting has a first intake connector which receives fluid from the first distribution connector. A first rotation member is coupled between the first intake connector and the first distribution connector such that the first fluid discharge fitting is rotatable about a first axis of rotation. The second fluid discharge fitting has a second intake connector which receives fluid from the second distribution connector. A second rotation member is coupled between the second intake connector and the second distribution connector such that the second fluid discharge fitting is rotatable about a second axis of rotation.

12 Claims, 6 Drawing Sheets

(51) Int. Cl.
*F16L 33/00* (2006.01)
*F16K 31/44* (2006.01)
*F16K 5/04* (2006.01)
*F16K 27/06* (2006.01)
*F16L 27/08* (2006.01)
*F16K 11/20* (2006.01)
*F16L 39/06* (2006.01)
*F16L 29/00* (2006.01)
*F16L 41/03* (2006.01)

(52) U.S. Cl.
CPC .......... *F16K 27/067* (2013.01); *F16K 31/445* (2013.01); *F16L 27/0816* (2013.01); *F16L 27/0841* (2013.01); *F16L 29/002* (2013.01); *F16L 33/006* (2013.01); *F16L 39/06* (2013.01); *F16L 41/03* (2013.01); *F16L 47/18* (2013.01)

(58) Field of Classification Search
CPC ......... F16L 33/006; F16L 47/18; F16L 39/06; F16K 5/0421; F16K 31/445; F16K 11/20; F16K 27/067; Y10T 137/87877
See application file for complete search history.

(56) References Cited

U.S. PATENT DOCUMENTS

| | | | | | |
|---|---|---|---|---|---|
| 3,208,719 | A | ‡ | 9/1965 | Hulsey | F16K 5/0421 251/207 |
| 3,788,344 | A | ‡ | 1/1974 | Dyck | F16K 27/003 137/271 |
| 3,831,983 | A | ‡ | 8/1974 | Stickler | F16L 19/025 285/12 |
| 4,614,014 | A | ‡ | 9/1986 | Ferguson | B23P 15/001 251/367 |
| 5,056,563 | A | ‡ | 10/1991 | Glossop | F17C 5/06 137/615 |
| 5,226,449 | A | ‡ | 7/1993 | Zimmerly | F16K 43/001 137/240 |
| 5,269,344 | A | ‡ | 12/1993 | McHugh | A62C 35/68 137/557 |
| 5,361,802 | A | * | 11/1994 | Kroll | F16K 11/24 137/552 |
| 5,379,761 | A | ‡ | 1/1995 | Schuler | A62B 9/02 128/205.24 |
| 5,558,124 | A | ‡ | 9/1996 | Randall | G01L 19/0015 137/597 |
| 5,711,338 | A | ‡ | 1/1998 | Talon | B01D 19/0063 137/8 |
| 5,782,455 | A | ‡ | 7/1998 | Burnworth | F16K 5/0421 251/343 |
| 5,934,327 | A | ‡ | 8/1999 | Nelson | F16K 11/22 137/549 |
| 6,058,975 | A | ‡ | 5/2000 | Hui-Chen | F16K 11/20 137/27 |
| 6,199,589 | B1 | ‡ | 3/2001 | Hillis | F16K 27/00 137/883 |
| 6,474,363 | B1 | ‡ | 11/2002 | Stephenson | F16K 11/207 137/883 |
| 6,581,596 | B1 | ‡ | 6/2003 | Truitt | A61M 16/0006 128/204.21 |
| 6,860,283 | B1 | ‡ | 3/2005 | Finkeldei | B08B 9/00 134/22.15 |
| 6,929,032 | B2 | ‡ | 8/2005 | Rehder | F16K 27/003 137/884 |
| 7,216,672 | B1 | * | 5/2007 | Chen | F16K 11/20 137/883 |
| 7,243,684 | B1 | * | 7/2007 | Chen | F16K 1/12 137/883 |
| 7,624,821 | B1 | ‡ | 12/2009 | Hall | E21B 21/08 175/231 |
| 8,333,410 | B2 | ‡ | 12/2012 | Boticki | F16L 37/0985 285/127.1 |
| 8,844,567 | B2 | ‡ | 9/2014 | Lockhart | F25B 41/003 137/551 |
| 9,038,665 | B2 | * | 5/2015 | Cheng | F16K 11/24 137/883 |
| 9,366,347 | B2 | ‡ | 6/2016 | Diehl | F16K 11/205 |
| 2004/0007276 | A1 | ‡ | 1/2004 | Sugg | B67D 1/08 137/883 |
| 2009/0272448 | A1 | ‡ | 11/2009 | Huang | F23N 1/007 137/883 |
| 2010/0284730 | A1 | ‡ | 11/2010 | Boticki | F16L 47/32 403/3 |
| 2014/0311589 | A1 | * | 10/2014 | Eley | F16L 41/03 137/315.2 |

\* cited by examiner
‡ imported from a related application

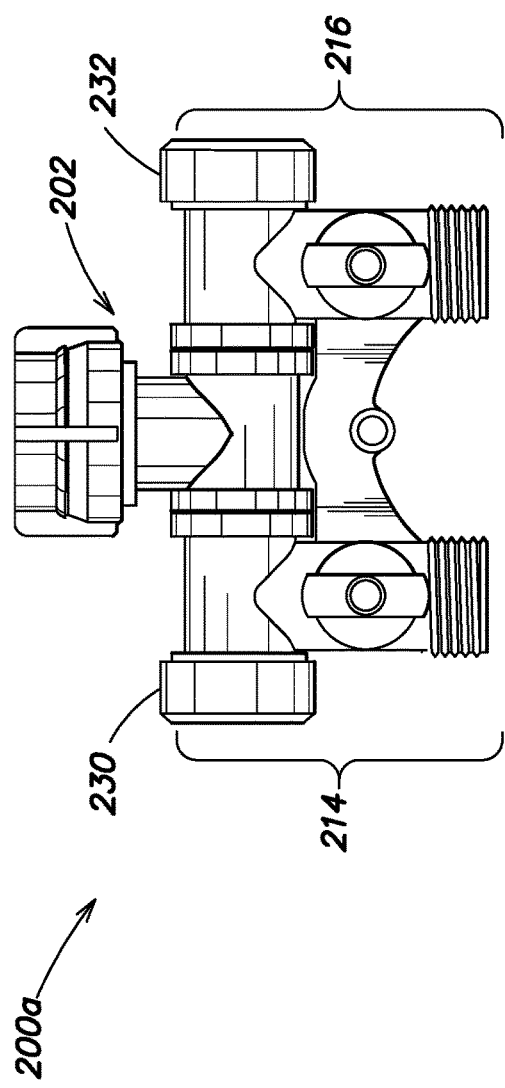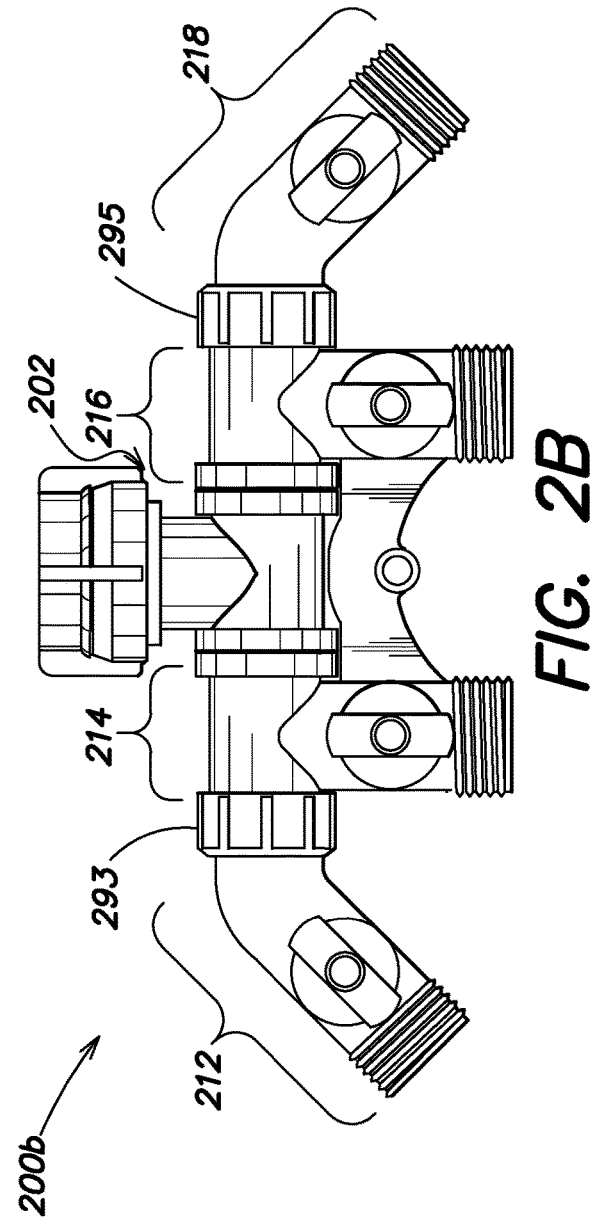

ADJUSTABLE MULTI-PORT CONNECTOR AND VALVE

CROSS-REFERENCE TO RELATED APPLICATIONS

This application is a continuation of and claims the benefit of priority to U.S. patent application Ser. No. 15/909,349 filed Mar. 1, 2018 and entitled "ADJUSTABLE MULTI-PORT CONNECTOR AND VALVE," the disclosure of which is herein incorporated by reference in its entirety.

TECHNICAL FIELD

The present technology pertains to pipes and hoses, and more specifically to improved valves and connectors thereof.

BACKGROUND

While hoses are designed to permit a direct coupling to a spigot or water source, e.g. via the rotatable engagement of male and female ends having complementary threading, it is often desirable to couple more than one hose to a given spigot. This desire is particularly noticeable in the context of residential homes, which typically have only one or two spigots.

Existing solutions typically take the form of a one-to-many style connector, comprising a rigid, hollow enclosure with a single female threaded port at its first end and two or more male threaded fluid ports at its second end. The particular design of these conventional connectors depends upon the number of male ports that are provided. Common designs include two male ports arranged in a 'V' shape, three male ports arranged in a manifold design, and four male ports arranged in a manifold design. In operation, the female port is attached to a spigot or other pressurized fluid source while each male port is attached to a hose. Water fills the hollow enclosure of the connector and is discharged through the male ports and into the coupled hoses, thereby allowing a user to distribute water from a single spigot through multiple different hoses.

However, these conventional connectors are known to be bulky, cumbersome, and difficult to both install and subsequently use. Due to their increased size, and the fact that spigots are typically found in close proximity to an exterior home wall, there may be insufficient horizontal clearance to rotate the entire connector body when attaching it to the spigot. There may also be insufficient vertical clearance to fit a conventional connector underneath a spigot but above a lower surface, such as a lawn, patio, shrubbery, etc. Due to the rigid nature of these connectors, users are often faced with awkward attachment angles at the male ports as compared to the attachment angle of the spigot itself that would otherwise be used. The orientation of the male ports can further force hoses into awkward angles and bends, constricting water flow, causing kinking, and reducing the lifespan of the hose. Accordingly, it would be highly desirable to provide a multi-port fluid connector that is adjustable to reduce or eliminate these clearance and kinking issues.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2A is a view of an example adjustable multi-port connector configured with two ports;

FIG. 2B is a view of the example adjustable multi-port connector of FIG. 2A configured with four ports;

DETAILED DESCRIPTION

Figure 1A:
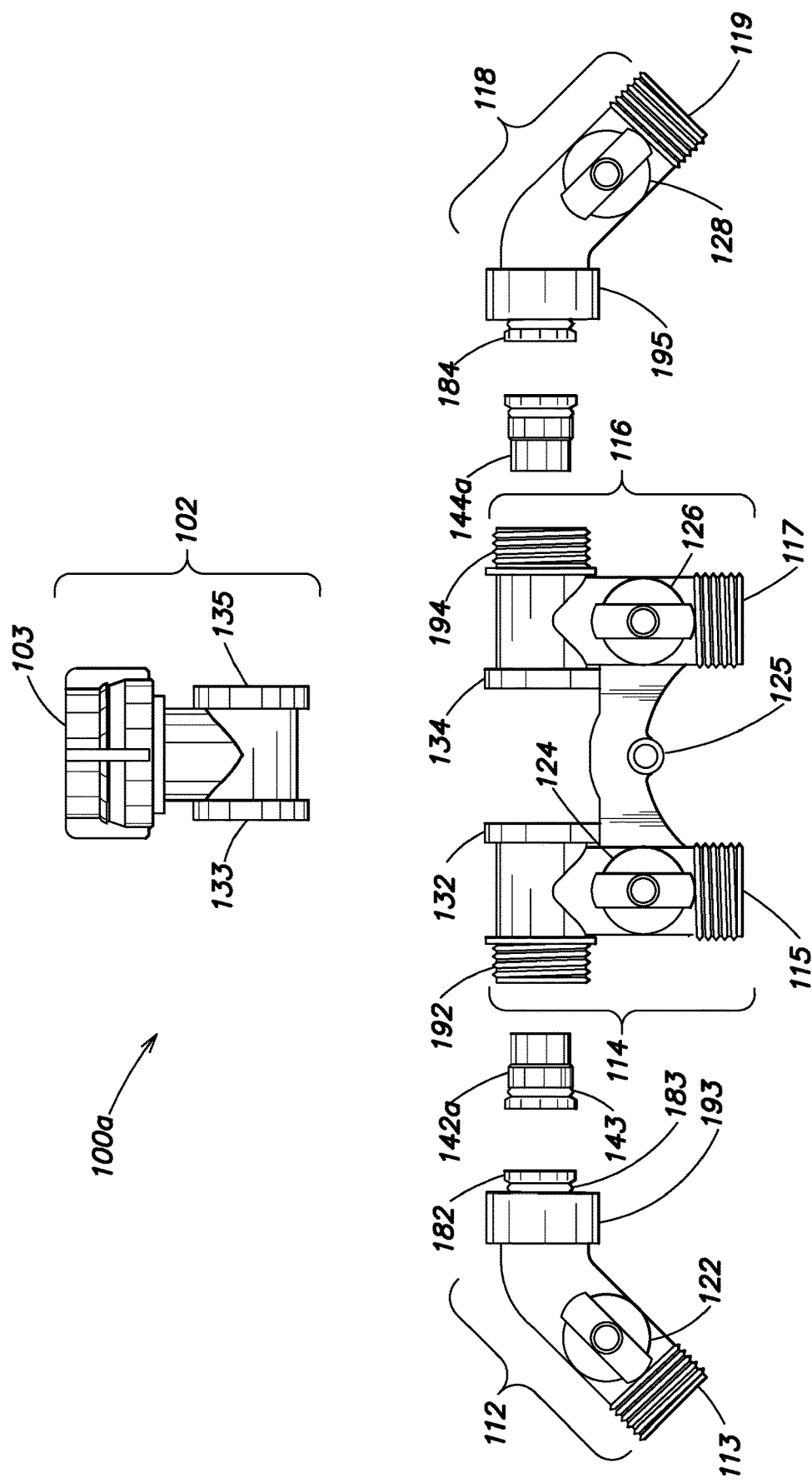
FIG. 1A is a exploded view of an example adjustable multi-port connector according to one embodiment of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Throughout the following description, reference may be made to a 'hose' or a 'pipe', with it being understood that the terms are used interchangeably to signify a member capable of conveying a fluid from one location to a second location. Similarly, a 'spigot' or 'tap' can be used to signify a fluid source, either pressurized or unpressurized. Pressurized fluid sources can be naturally (i.e. via gravity) or artificially (i.e. via electric motor) driven in accordance with one or more techniques known in the art. Additionally, when reference is made herein to a connector element being 'coupled', 'fluidly coupled', 'connected', 'attached', etc. to a hose, pipe, spigot, pressurized fluid source, etc., it is understood that such references are generally made without a specific dimensional requirement unless noted otherwise. That is, it is appreciated that one or more connector elements described herein can be configured to couple with, for example, a ½ inch diameter hose, a ⅝ inch diameter hose, a ¾ inch diameter hose, etc. without departing from the scope of the disclosure.

Figure 1B:
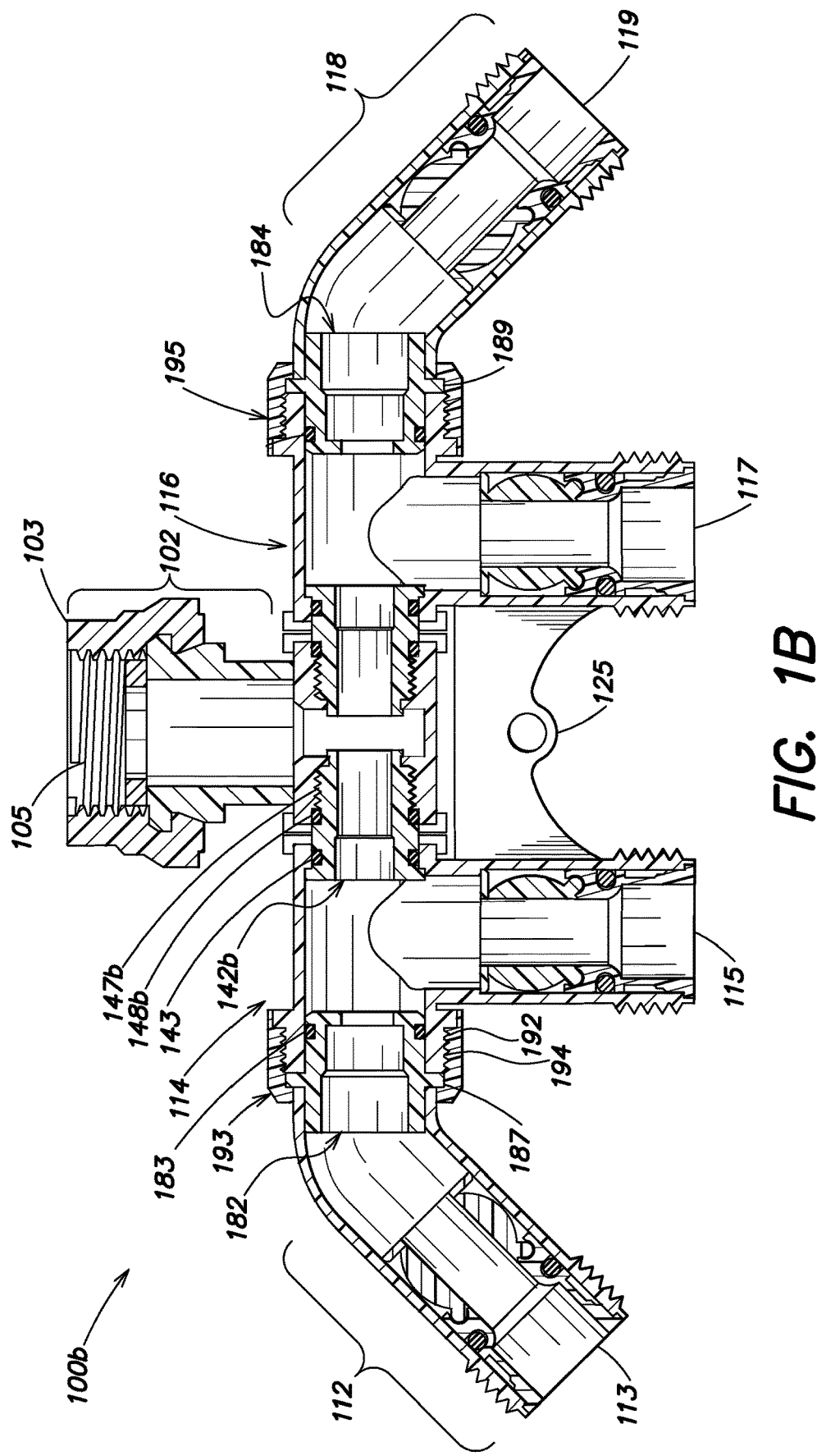
FIG. 1B is a cross-sectional view of an example adjustable multi-port connector according to one embodiment of the present disclosure.

The disclosure turns now to a discussion of FIGS. 1A and 1B. FIG. 1A depicts an exploded view of an exemplary adjustable multi-port connector element 100a of the present disclosure and FIG. 1B depicts a cross-sectional view of an exemplary assembled adjustable multi-port connector element 100b, which in some embodiments can be the same as connector element 100a. Unless noted otherwise, reference made to connector element 100a is equally applicable to connector element 100b, as the two share many components in common. Components sharing a function between the two adjustable multi-port connectors 100a and 100b are indicated by common reference numerals, while components specific to connector 100a are indicated by appending an 'a' to the reference numeral and components specific to connector 100b are indicated by appending a 'b' to the reference numeral.

Adjustable multi-port connector 100a may be constructed from one or more different suitable materials, based on considerations such as price, desired strength, desired longevity, expected operating environment, available manufacturing equipment, etc. Particularly, each of its constituent components may be constructed from materials that include, but are not limited to, plastics such as polyethylene, nylon, PVC, polypropylene and metals such as brass and stainless steel, or any other such suitable materials as would be appreciated by one of ordinary skill in the art. The choice of a specific material may be driven by parameters such as cost, durability, weather resistance, pressure requirements, or any other such parameters.

As shown, adjustable multi-port connector 100a comprises a fluid entry port 102, inner fluid discharge ports 114 and 116, and outer fluid discharge ports 112 and 118. In the context of the present disclosure, these 'ports' are alternatively and interchangeably referred to as 'fittings', e.g. fluid entry port 102 or fluid entry fitting 102. Rotatable couplings provide interconnections between these five fluid entry and discharge ports to form the continuous and sealed body or exterior portion of adjustable multi-port connector 100a. More importantly, the rotatable couplings allow the five ports 102, 112, 114, 116, and 118 to be manipulated into numerous different configurations of relative rotation, e.g. by adjusting the angles between various combinations of the five ports, thereby providing a flexibility and adjustability that is not found in conventional rigid-body connectors.

As shown, fluid entry fitting 102 is provided with a female end connector 103 at a first distal end, although it is appreciated that a male connector may be substituted without departing from the scope of the present disclosure. In some embodiments, the female end connector 103 (or a substituted male connector, as desired) can be integrally formed with the first distal end or another suitable location on adjustable multi-port connector 100a. In some embodiments, quick connector style couplings can be employed such that male and female coupling ends can be quickly swapped out via the quick connector receiving end. Visible in FIG. 1B, female end connector 103 includes a female threading 105 circumferentially located about its inner surface. This female threading 105 can be integrally formed with female end connector 103 (e.g. molded into the inner wall) or can be a separate component (e.g. a threaded brass or metal insert, for greater durability). In general operation, female end connector 103 attaches to a correspondingly sized fluid source having a male threading that is complementary to female threading 105, such that female end connector 103 thereby establishes a fluid coupling between the fluid source and the fluid entry fitting 102. In instances where the fluid source is a spigot, such as those commonly found on most residential and commercial buildings and used to provide access to municipal water (pressurized in the range of 25-120 psi, although in some municipalities pressurizations in excess of 120 psi may exist), fluid entry fitting 102 and fluid discharge fittings 112, 114, 116, 118 can be designed to exceed a maximum expected pressurization range by some safety margin, e.g. $2x$ or $5x$.

The fluid from fluid entry fitting 102 can be split into up to four separate fluid streams, or otherwise distributed to each of the four fluid discharge fittings 112, 114, 116, 118. In some embodiments, fluid from fluid entry fitting 102 will always be split amongst all four of the fluid discharge fittings, i.e. no control is provided over the fluid flow through any particular one of the four fluid discharge fittings. In some embodiments, one or more of the fluid discharge fittings can be provided with a flow control mechanism to partially or completely restrict fluid flow through the corresponding fluid discharge fittings. As illustrated, the four fluid discharge fittings 112, 114, 116, 118 are provided with flow control mechanisms 122, 124, 126, 128, respectively. These flow control mechanisms can comprise a variety of different valve mechanisms, including, but not limited to: ball valves, butterfly valves, gate valves, globe valves, etc. Additionally, the four fluid discharge fittings 112, 114, 116, 118 are provided with male end connectors 113, 115, 117, 119, respectively. In some embodiments, one or more of the male end connectors might be static or rigidly affixed to one of the four fluid discharge fittings. In some embodiments, one or more of the male end connectors might be rotatably affixed (e.g. via one or more O-rings) to one of the four fluid discharge fittings, such that the a user can couple a hose by simply rotating the male end connector rather than rotating the hose itself (this helps reduce kinking, bending, twisting, etc. of the hose). Via these male end connectors, a fluid coupling can be established between a fluid discharge fitting and an appropriately sized female-threaded ferrule or connector of a hose, pipe, or other fluid conveyance. Thus, as illustrated, multi-port connector element 100a can provide a fluid coupling between a single spigot and up to four different hoses.

However, it is appreciated that multi-port connector 100a can be configured with a different number of fluid entry fittings and/or fluid discharge fittings than are shown, either during its manufacture or via a subsequent adjustment or re-configuration process. One such re-configuration process will be later described with respect to FIGS. 2A and 2B, which depict the same adjustable multi-port connector element configured in a two-port/two-fitting configuration 200a and a four-port/four-fitting configuration 200b Similarly, it is appreciated that a given fluid entry fitting or fluid discharge fitting of adjustable multi-port connector element 100a can be configured with male threads or female threads without particular limitation, wherein such configuration can be performed during manufacture or via a subsequent adjustment. For example, a male end connector can be removed and replaced with a female end connector, or can be connected to a male-to-female adapter. A female end connector can be removed and replaced with a male end connector, or can be connected to a female-to-male adapter.

Returning now to the discussion of fluid entry fitting 102, located at a second distal end of fluid entry fitting 102 (i.e.

opposite from the first distal end where female end connector 103 is located) is a T-junction comprising a first distribution connector 133 and a second distribution connector 135. These first and second distribution connectors are utilized to provide a rotatable engagement between first intake connector 132 of inner fluid discharge fitting 114 and between second intake connector 134 of inner fluid discharge fitting 116, respectively. In other words, fluid entry fitting 102 can rotate relative to one or more of the inner fluid discharge fittings 114 and 116, and vice versa. Note that as illustrated, a rigid connector 125 is attached between the inner fluid discharge fittings 114 and 116, meaning that they form a single body for purposes of rotation. Accordingly, the inner fluid discharge fittings 114 and 116 are held in a fixed positioning relative to one another and will both undergo the same relative rotation with respect to fluid entry fitting 102. In some embodiments, rigid connector 125 can be omitted, in which case inner fluid discharge fittings 114 and 116 can rotate independently of one another and fluid entry fitting 102.

As illustrated, rotary elements 142a and 144a (also referred to as rotation members) are utilized to provide this relative rotation between fluid entry fitting 102 and inner fluid discharge fittings 114 and 116. In operation, rotary element 142a is installed between first discharge connector 133 and first intake connector 132, while rotary element 144a is installed between second discharge connector 135 and second intake connector 134, as will be described below. The rotatable engagement provided by rotary elements 142a and 144a can be configured to permit a full 360 degrees of rotation, 180 degrees of rotation, or some other desired angular range of rotation, for example by using internal or external stops or limits. In some embodiments, the rotary elements 142a and 144a can be capable of performing a full 360 degrees of rotation but might be impeded by the physical size of one or more of fluid entry fitting 102 and inner discharge fittings 114 and 116 such that only a partial range of rotation is possible. For example, fluid entry fitting 102 as shown cannot be rotated 180 degrees as it will collide with rigid connector 125 and/or the inner discharge fittings 114 and 116 before the full 180 degree rotation can be completed.

The functionality of rotary element 142a with respect to first discharge connector 133 and first intake connector 132 is described below, although it is appreciated that this description applies equally to the functionality of rotary element 144a with respect to second discharge connector 135 and second intake connector 134, which can be of a substantially identical design. Rotary element 142a is installed between the first intake connector 132 of fluid discharge fitting 114 and the first distribution connector 133 of fluid entry fitting 102. Accordingly, rotary element 142a is typically of an outer diameter that is less than or equal to the inner diameter of the first connectors 132, 133, which may themselves have different inner diameters. In some embodiments where rotary element 142a is installed via a press fit, rotary element 142a may have an outer diameter that is slightly greater than the inner diameter of one or more of the first connectors 132, 133. As illustrated, rotary element 142a includes an O-ring 143, which can be seated in a receiving groove along the outer surface of the rotary element.

Rotary element 142a is installed such that it extends across the interface between first intake connector 132 and first distribution connector 133. For example, on one side of the interface, the portion of rotary element 142a containing O-ring 143 is placed freely, such that O-ring 143 is disposed between rotary element 142a and the inner wall of first intake connector 132. On the other side of the interface, the opposite end of rotary element 142a is rigidly affixed to the inner wall of first distribution connector 133, e.g. using a press-fit, an adhesive, a thermal bond, or various other techniques known in the art. In this manner, first intake connector 132 of fluid discharge fitting 114 is free to rotate relative to rotary element 142a. Because rotary element 142a is rigidly affixed to first discharge connector 133 of fluid entry fitting 102, the above rotation is also made relative to fluid entry fitting 102. In this manner, O-ring 143 and rotary element 142a have the ultimate effect of permitting smooth and continuous relative rotation between fluid discharge fitting 114 and fluid entry fitting 102. In some embodiments, the configuration described above can be reversed, e.g. O-ring 143 placed within first discharge connector 133 and rotary element 142a rigidly affixed to first intake connector 132. In either scenario, O-ring 143 enables the smooth and continuous relative rotation between fluid entry fitting 102 and fluid discharge fitting 114, including when fluid flow is present between the two. Advantageously, this permits adjustments to be made without having to cease fluid flow through connector 100, e.g. without having to turn off a spigot to which connector 100a is attached.

Turning now to FIG. 1B, rotary element 142b is slightly modified versus rotary element 142a of FIG. 1A. Rotary element 142b includes a male threading 147b which would be used in place of a press-fit or adhesive in order to achieve the rigid attachment described above, and in some embodiments can provide a stronger rigid attachment than a press-fit or adhesive. For example, male threading 147b would be received into a corresponding female threading provided along the inner wall of the first intake connector 132 of fluid discharge fitting 114, while O-ring 143 would be disposed between rotary element 142b and the inner wall of first discharge connector 133 of fluid entry fitting 102. This configuration would thereby allowing the same smooth and continuous relative rotation between fluid discharge fitting 114 and fluid entry fitting 102 as was described above. As was the case with rotary element 142a of FIG. 1A, O-ring 143 permits relative rotation adjustments to be made without having to cease fluid flow through connector 100b. Note that FIG. 1B depicts rotary element 142b as including an additional O-ring 148b, which has no counterpart in FIG. 1A. The additional O-ring 148b in this case is provided at the male threading 147b in order to provide a watertight seal and/or a mechanical stop such that male threading 147b cannot be overtightened during installation of rotary element 142b.

It is contemplated that the torque required to overcome the resistance provided by any given rotary element will fall within the realm of normal human exertion, e.g. with fluid entry fitting 102 attached to a spigot, a user could rotate fluid discharge fitting 114 with a mild to moderate exertion. In some embodiments, this threshold torque, below which no rotation will occur, can be adjusted by the user. In general, it is contemplated that some degree of resistance to rotation can be useful to provide a weak locking mechanism and/or to prevent accidental or inadvertent rotations, particularly when the user is distant from the connector 100, e.g. using an attached hose to water a garden. In some embodiments, a dedicated locking mechanism can be provided, such that no rotation is possible until the dedicating locking mechanism has been disengaged. Such a locking mechanism might include a slider that in the unlocked configuration is engaged with only one of fluid discharge fitting 114 and fluid entry fitting 102, while in the locked configuration is moved forward to pass over the interface between the two ports and subsequently engage with both fluid discharge fitting 114 and fluid entry fitting 102. In this manner, such a slider can provide a temporary rigid locking connection between the two ports to thereby prevent any further or accidental relative rotation between them.

In addition to the two inner fluid discharge fittings 114, 116 described above, FIG. 1A depicts connector 100a as being provided with two outer fluid discharge fittings 112, 118. In general, these two outer fluid discharge fittings 112, 118 are of a generally similar design and functionality as has been described above with respect to the two inner fluid discharge fittings 114, 116, although various differences in design will be described below. Unlike the inner discharge fittings, which are coupled by rigid connector 125, the two outer discharge fittings 112, 118 are independently attached; that is, they are free to move relative to one another. As was the case with the inner fluid discharge fittings, it is contemplated that the movement of these outer discharge fittings 112, 118 is provided via suitable rotatable engagements that permit a desired degree of rotation to be performed, e.g. 360 degrees.

As illustrated, the outer fluid discharge fittings 112, 118 are of an angled design whereas the inner fluid discharge fittings 114 and 116 are of a 90-degree or T-shape design. This can be a matter of ergonomics rather than an intrinsic fluid flow consideration—as mentioned earlier, the T-shape design of the inner fluid discharge fittings 114, 116 can be bulky and impede their ability to perform a full 360 degree rotation, as they are likely to collide with the fluid entry fitting 102 or some other portion of the body of connector 100a. Accordingly, the angled design of the outer fluid discharge fittings 112, 118 provides additional lateral clearance with respect to the remaining portion of the body of connector 100a to ensure an unimpeded ability to perform 360 degree rotation, if so desired.

Here, it is contemplated that the inner diameter and/or fluid flow rates of all four fluid discharge fittings 112, 114, 116 and 118 is substantially the same, although in some embodiments these factors may be varied. For example, in one example, connector 100a might be configured such that the inner fluid discharge fittings 114, 116 are of a first, smaller inner and/or outer diameter and the outer fluid discharge fittings 112, 118 are of a second, larger inner and/or outer diameter. The male end connectors 113, 115, 117 and 119 that are provided on the discharge fittings can also be correspondingly adjusted in diameter, advantageously permitting hoses and other fluid conveyances of varying diameters to be attached to the same connector 100a. Reducing the outer diameter of the inner fluid discharge fittings 114 and 116, as well as reducing the diameter of their corresponding male fittings, can be advantageous in view of the space limitations mentioned previously, as both of these adjustments can be helpful in avoiding problems of impeded rotation of the inner discharge fittings 114 and 116, as well as that of fluid entry fitting 102. Additionally, because there is relatively more space available in the vicinity of the outer discharge fittings 112 and 118, they can more freely be designed to have larger inner and/or outer diameters, as well as larger diameter male fittings that are suitable for attaching to larger hoses and other fluid conveyances.

When adjustments are made to the inner diameter of the fluid discharge fittings, this typically will result in the discharge fittings supplying fluid at different pressurizations, although this can depend strongly upon the supply pressure of the fluid. These pressure differences can be desirable in some scenarios, although in others, users might instead desire consistent and predictable performance from all fluid discharge fittings. Accordingly, pressure boosters or flow constrictors can be installed within the lower pressure fluid flow ports as needed.

Returning now to the two outer fluid discharge fittings 112 and 118, FIG. 1B depicts these two outer fluid discharge fittings with rotary elements 182 and 184, respectively. As with the rotary elements 142a and 144a of the inner discharge elements, the presently discussed rotary elements 182 and 184 may either be integrally formed with one of the four fluid discharge fittings, provided as a separate component, or some combination of the two. In some embodiments, the rotary elements 182 and 184 can be injection molded or otherwise formed from a plastic material, which may similar or identical plastic to one or more other components of the connector 100A.

In some embodiments, and as is illustrated in connector 100b of FIG. 1B, rotary elements 182 and 184 can be provided with flanges 187 and 189, respectively, for purposes of providing a mechanical stop during installation of the rotary element and to further secure the rotary element. The following discussion makes specific reference to rotary element 182 and its installation between outer fluid discharge fitting 112 and inner fluid discharge fitting 114, it is understood that the discussion applies equally to rotary element 184 and its installation between outer fluid discharge fitting 118 and inner fluid discharge fitting 116.

Rotary element 184 can be rigidly affixed to the interior wall of outer discharge fitting 112, for example using a press-fit or an adhesive, as described previously with respect to rotary elements 142a and 144a, or using some other suitable attachment technique. Once rigidly affixed within outer discharge fitting 112 (as may be seen in FIG. 1A, which depicts a non-exploded view of this configuration), the free end of rotary element 184 can then be inserted within the inner discharge fitting 114, where it will not be affixed but will instead be allowed to rotate freely, thereby achieving the desired rotation. This can be a loose press-fit, where the degree of friction can be used to impart the desired resistance to rotation, i.e. to set a threshold torque required to initiate rotation.

Note that the free end includes an O-ring 183, which is shown as being received into a groove cut into the outer face of rotary element 184. This O-ring 183 will aid in providing the smooth and continuous rotation between the outer discharge fitting 112 and the inner discharge fitting 114. Once the free end of rotary element 184 has been inserted into the inner fluid discharge fitting 114, suitable rotation can be achieved. However, inner fluid discharge fitting 114 is not secured to outer fluid discharge fitting 112 along their longitudinal axis (i.e. the axis running left to right in FIGS. 1A and 1B), meaning that the two components could fall out of attachment, particularly since O-ring 183 will most typically only provide a loose attachment in this longitudinal direction.

Accordingly, outer discharge fitting 112 is depicted with a rotatable collar 193, meaning that collar 193 can rotate with respect to discharge fitting 112. The inner wall of collar 193 is provided with a female threading 194, which can be seen in the cross-section of FIG. 1B as engaged with a corresponding male threading 192 that is provided on inner discharge fitting 114. Once tightened, collar 193 functions to rigidly affix inner discharge fitting 114 and outer discharge fitting 112 to one another, but only in the longitudinal direction, meaning that they still remain free to rotate relative to one another but without the risk of falling out of connection or engagement.

Collar 193 can permit user modification to the connectors 100a and 100b, as a user simply needs to grasp the collar 193 and rotate it in a direction suitable to disengage its female threading 194 from male threading 192, which typically is counter-clockwise. This permits a user to swap the depicted outer fluid discharge fittings 112, 118 for other fluid discharge fittings with a compatible threading. For example, a user might wish to use a fluid discharge fitting with a different inner or outer diameter, with different fluid flow characteristics, with a male end connector having different dimensions, with a female end connector instead of a male end connector, or any combination of the above and various other parameters. In other instances, a user may wish to provide connector 100a with more than four total fluid discharge fittings, in which case one or more of the outer fluid discharge fittings 112, 118 could be swapped for outer fluid discharge fittings having a dual discharge arrangement, i.e. an outer fluid discharge fitting could terminate into two male end connectors rather than just the single male end connector 113 shown with outer fluid discharge fitting 112.

In some embodiments, collar 193 (and collar 195) can be replaced with the connection mechanism used to attach fluid entry fitting 102 to the inner fluid discharge fittings 114, 116 as this mechanism is generally slimmer and more compact. However, this replacement may eliminate the ability of a user to easily swap the outer discharge fittings 112, 118 as described above. In embodiments wherein collar 193 is employed, the male threading 192 and the female threading 194 can be the same as common garden hose threading, or otherwise can be the same as the threading utilized on one or more of the male end connectors 113, 115, 117 and 119.

If a common garden hose threading is employed for male threading 192, then it is noted that the female end connector of a garden hose could be attached directly to connector 100a via the male threading 192, although some convenience may be lost due to the general requirement that the hose be attached to male threading 192 without any fluid flowing through connector 100a. However, in particularly compact installation locations, such a usage may be necessary, as connector 100a may be used in smaller spaces when the bulk of one or more of the outer fluid discharge fittings 112 and 118 is eliminated.

Rather than attaching a hose to male threading 192, connector 100a can be provided with an end cap element that screws on to the female threading 194 and thereby prevents any fluid flow. This converts the four-port connector 100a into a two-port connector. An example adjustable two-port connector 200a with two end caps 230 and 232 is shown in FIG. 2A, presented in a side-by side fashion with an example fully assembled adjustable four-port connector 200b as shown in FIG. 2B. The two-port connector 200a comprises a fluid entry fitting 202 that is in rotatable engagement with fluid discharge fittings 214 and 216, which in some embodiments can be identical in design and/or function to fluid entry fitting 101 and fluid discharge fittings 114 and 116. However, rather than being attached to an additional set of fluid discharge fittings, fluid discharge fitting 114 is capped with an end cap 230 and fluid discharge fitting 116 is capped with an end cap 232. Although not visible, the ends caps 230 and 232 can be configured with female threading along their interior surface that is suitable for engagement with the corresponding male threading (not visible) present at the top left portion of fluid discharge fitting 214 and at the top right portion of fluid discharge fitting 216.

For purposes of comparison, FIG. 2B depicts a four-port connector 200b which utilizes the same components as two-port connector 200a. The combination of FIGS. 2A and 2B generally illustrates the ability to convert directly between the two-port configuration of 200a and the four-port configuration of 200b. This conversion can be performed by a user, or can be performed during manufacture. More particularly, the commonality between two-port design 200a and four-port design 200b can reduce manufacturing costs, as only a single manufacturing line is required for a majority of the components, i.e. the fluid entry fitting 202, the discharge fittings 214 and 216, and their internal coupling components, etc., with a smaller, secondary line for producing the outer fluid discharge fittings 212 and 218. This can yield increased efficiencies in comparison to running two separate manufacturing lines, one for a two-port design and one for a four-port design.

In instances where the conversion between two-port and four-port configurations is performed during manufacture, or when it is otherwise not desirable to permit user modification or disassembly of the final assembled version of the disclosed connectors, an adhesive might be used in conjunction with the threaded attachment of collars 293 and 295 to thereby affix the outer fluid discharge fittings 212 and 218 more permanently and securely to the inner fluid discharge fittings 214 and 216.

Figure 3:
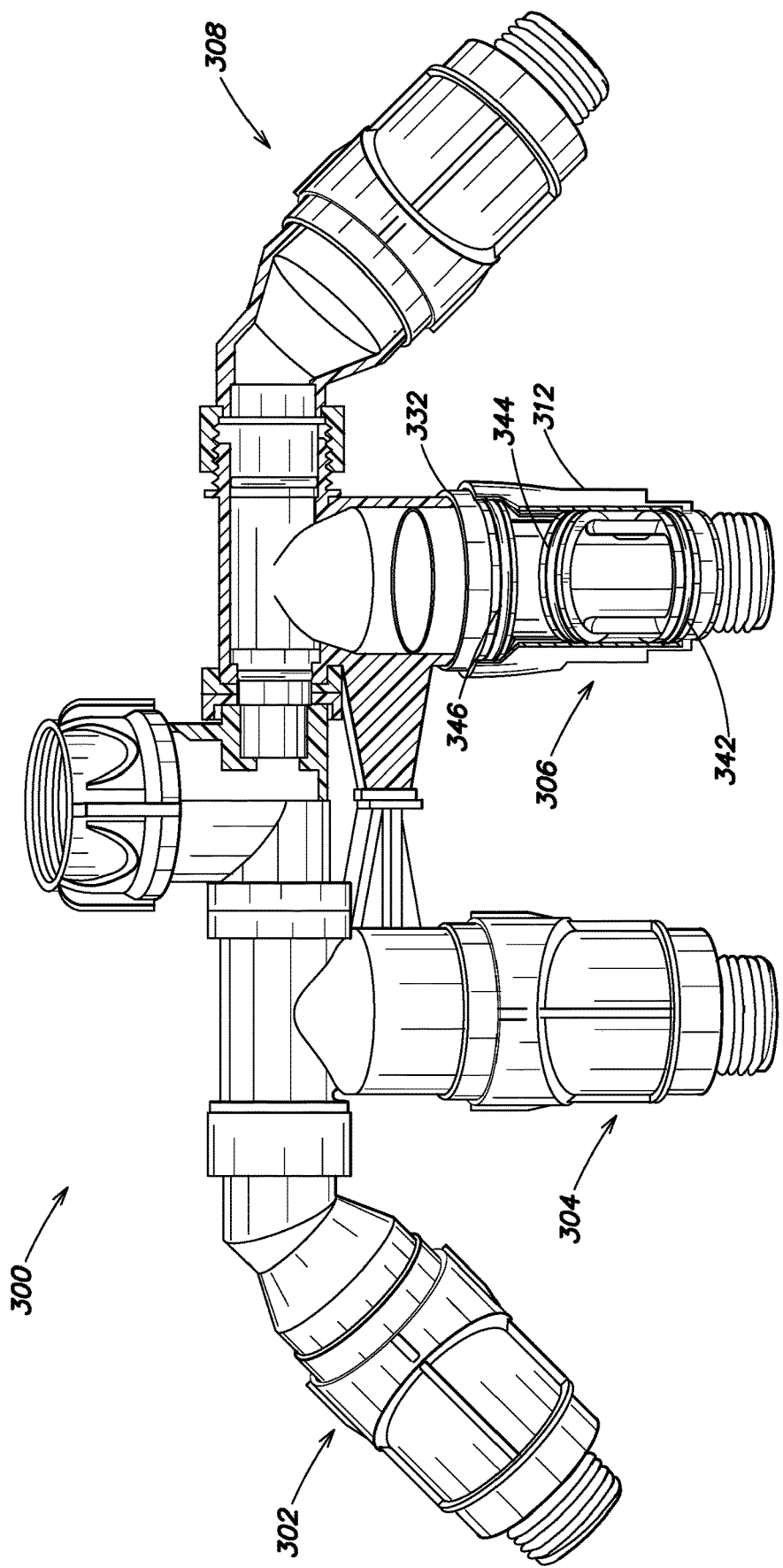
FIG. 3 is a perspective view of an example adjustable multi-port connector with improved rotatable valves according to one embodiment of the present disclosure.

The disclosure turns now to FIG. 3, which depicts a perspective view of a multi-port connector 300 having an improved rotatable valve design for controlling fluid flow through its fluid discharge fittings. Connector 100a was depicted in FIG. 1A as having flow control mechanisms 122, 124, 126, 128 of a ball-valve type design, having an external handle or knob portion that is twisted in a counter-clockwise or clockwise fashion in order to adjust the flow of fluid through the ball valve within the fluid discharge fitting. Connector 300 utilizes four improved rotatable valves 302, 304, 306 and 308, which are easier for a user to both grasp and control. Specific reference will be made to valve 306, although it is appreciated that the four valves can be identical and the following disclosure can apply equally to each. Furthermore, it is appreciated that the disclosed rotatable valve is not limited only to the configuration seen in FIG. 3, and can be provided in lieu of other flow adjustment mechanisms in various adjustable multi-connector embodiments of the present disclosure, including those described above with respect to FIG. 1A-2B.

Rotatable valve 306 includes an external flow guide 312 that encloses an internal flow gate 332. Flow guide 312 can be of a unitary construction, for example of injection molded plastic, and it is noted that flow guide 312 additionally acts as an exterior covering portion of the rotatable valve 306. That is, flow guide 312 is exposed to the surrounding environment in which connector 300 is placed, and furthermore is the surface that a user grasps in order to adjust the fluid flow through rotatable valve 306. Accordingly, it can be desirable to provide a textured or matte surface to the exterior of flow guide 312 in order to increase its friction with a user's hand or fingers.

In general operation, flow guide 312 can be rotated about the flow gate 332, which remains stationary. This relative rotation between the two, in combination with their particularly designed interior portions, causes fluid flow to either be increased or decreased. In order to maintain flow gate 332 in a stationary position during such rotation, the flow gate 332 can be rigidly affixed to the body of connector 300, i.e. rigidly affixed to a fluid discharge fitting. Flow guide 312 and flow gate 332 can be designed to require various amounts of rotation to transition between a fully on and a fully off position. For example, a full 360 degree rotation might be required between the two positions, or a 180 degree rotation might be required. In some embodiments, it is contemplated that only a quarter-turn is required, e.g. 90 degrees of rotation in order to move between fully on and fully off. In order to provide for a smooth rotation, no matter its range, flow gate 332 is provided with O-rings 342, 344 and 346, which are each received into corresponding grooves on the exterior surface of flow gate 332. In addition to assisting rotation, these O-rings 342, 344 and 346 additionally function to seal the rotatable valve 306 from leaks or any other undesired fluid movements. As illustrated, O-rings 342 and 346 are parallel to one another and are perpendicular to the longitudinal (vertical) axis of flow gate 332. O-ring 344 is positioned on flow gate 332 at an angle with respect to both O-rings 342 and 346 and to the longitudinal axis of flow gate 332. The reasons for this angled placement will be made clear in the description below.

Figure 4:
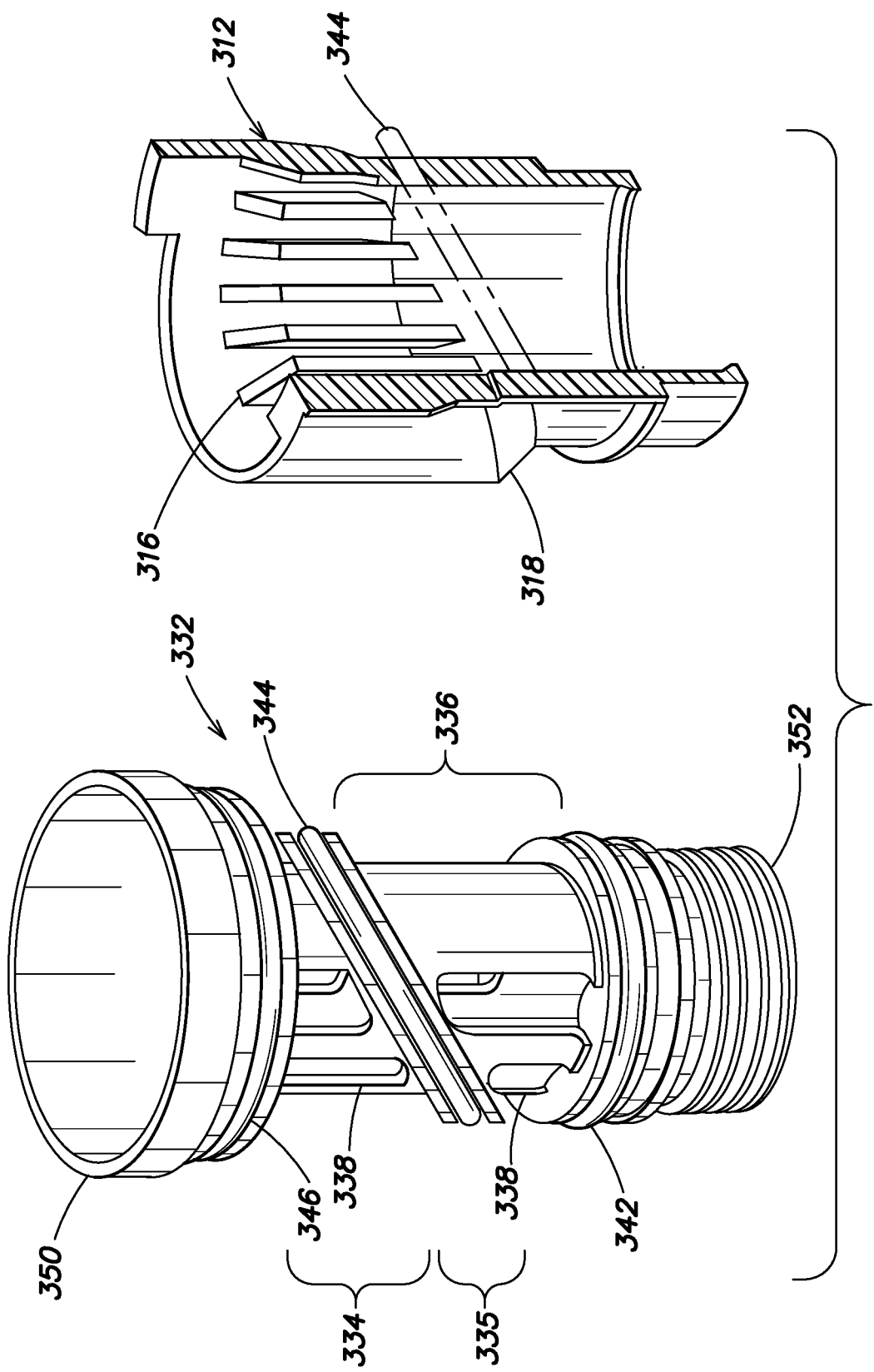
FIG. 4 is an exploded view of a rotatable valve according to one embodiment of the present disclosure.
Figure 5:
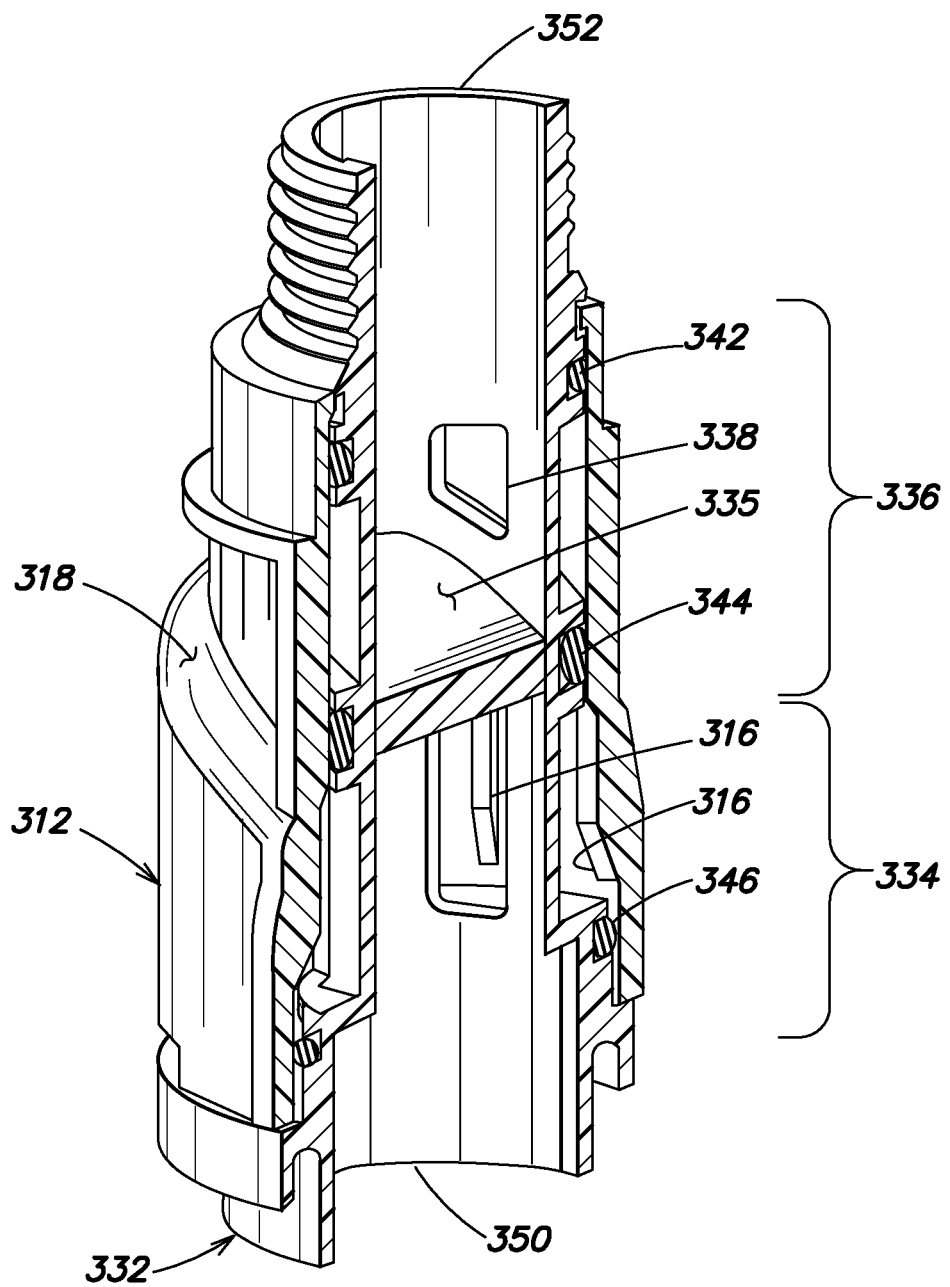
FIG. 5 is a perspective cutaway view of an assembled rotatable valve according to one embodiment of the present disclosure.

The disclosure now turns to FIG. 4, which depicts a perspective view of flow gate 332 presented side-by-side with a cutaway of flow guide 312. Both flow gate 332 and flow guide 312 are oriented in the closed position. Because FIG. 4 effectively depicts an exploded view of rotatable valve 306, FIG. 5 is also provided and depicts a cross-sectional view of an assembled rotatable valve 306. Numerical reference values between FIGS. 4 and 5 are identical and the following description is made with reference to both figures.

Recall that flow gate 332 is coupled to a fluid source (e.g. one of the fluid discharge fittings of the disclosed multi-port connector) at an intake fitting 350, so in the context of FIG. 4, fluid flow is generally in a top to bottom direction, ultimately exiting through a discharge fitting 352 of the flow gate 332. Notably, this means that when fluid enters and exits the overall rotatable valve 306 construction, it is entering and exiting only via flow gate 332—flow guide 312 is an intermediate component which can internally redirect and control fluid flow.

On flow gate 332, O-ring 344 is received into an angled intermediate face 335, which divides flow gate 332 into an upper portion 334 and a lower portion 336. Both portions include a plurality of vertical slots 338 which permit the radial movement of fluid within the given portion. However, flow gate 332 provides no fluid connection between the two portions: upper portion 334 is connected to the intake fitting 350 and lower portion 336 is connected to the discharge fitting 352, but intermediate face 335 otherwise divides the two portions.

Such a connection between upper portion 334 and lower portion 336 is instead provided by flow guide 312, which has a greater diameter than the diameter between the vertical slots 338 of either portion 334 or 336. Thus, when flow guide 312 is installed over flow gate 332, it defines an additional volume that encloses both upper portion 334 and lower portion 336. When this additional volume is continuous, upper portion 334 and lower portion 336 are fluidly connected. When this additional volume is divided, upper portion 334 and lower portion are fluidly disconnected. This is the underlying operational principle of the rotatable valve 306.

Flow guide 312 includes a plurality of protrusions 316 circumferentially arranged about its interior surface, each protrusion placed a fixed distance from the upper opening of flow guide 312 but extending varying distances longitudinally downwards. The differing lengths of the protrusions 316 result in the formation of a ridge 318, visible on both the inner and outer surfaces of flow guide 312. Note that the angle of ridge 318 is the same as the angle of O-ring 344 (which is overlaid on flow guide 312 for clarity). As shown in FIG. 4, O-ring 344 is entirely located beneath ridge 318 and is in uninterrupted contact with the smooth inner surface of flow guide 312. This corresponds to the closed position—the uninterrupted contact of O-ring 344 divides flow guide 312 into two separate volumes, just as O-ring 344 divides flow gate 332 into a separate upper portion 334 and lower portion 336.

However, if fluid guide 312 is rotated away from this closed position, then ridge 318 and O-ring 344 will fall out of alignment, causing O-ring 344 to transition from making contact with the interior of flow guide below ridge 318 to instead making contact at and above ridge 318—i.e. making contact with protrusions 316. Based on the geometry of protrusions 316 (e.g. width and depth), O-ring 344 will not be able to make an uninterrupted seal, as gaps will be present between adjacent ones of the protrusions 316. These gaps create a path for fluid to flow from above O-ring 344 to below; from upper volume 334 to lower volume 336 of flow gate 332.

All else equal, the flow rate through rotatable valve 306 will depend upon the number of open gaps, which in turn depends upon the number of protrusions 316 that are in contact or extend below O-ring 344: for every n such protrusions, n−1 gaps or fluid flow paths will be opened. As mentioned previously, the depth and inter-pair spacing of the protrusions 316 define the flow characteristics of rotatable valve 306, as these two parameters roughly correlate with the depth and width of the gaps that provide fluid flow channels from upper volume 334 to lower volume 336. By adjusting the length of protrusions 316, and more specifically adjusting the length profile that defines the angle of ridge 318, the flow rate adjustment achieved per degree of rotation can be adjusted as desired.

We claim:

1. A connector apparatus comprising:
   a fluid entry fitting having a first end connector, a first distribution connector and a second distribution connector, wherein the first end connector is threaded for attachment to a fluid source;
   a first fluid discharge fitting having a first intake connector and first discharge connector, wherein the first intake connector receives fluid from the first distribution connector;
   a first rotation member coupled between the first intake connector and the first distribution connector, wherein the first rotation member has an outer diameter that is less than an inner diameter of the first distribution connector and less than an inner diameter of the first intake connector, such that the first fluid discharge fitting is rotatable about a first axis of rotation with respect to the fluid entry fitting;
   a second fluid discharge fitting having a second intake connector and a second discharge connector, wherein the second intake connector receives fluid from the second distribution connector; and
   a second rotation member coupled between the second intake connector and the second distribution connector, wherein:
   the second rotation member has an outer diameter that is less than an inner diameter of the second distribution connector and less than an inner diameter of the second intake connector, such that the second fluid discharge fitting is rotatable about a second axis of rotation with respect to the fluid entry fitting; and the second fluid discharge fitting is rigidly connected to the first fluid discharge fitting by a rigid connector attached therebetween, wherein the second fluid discharge fitting and the first fluid discharge fitting rotate together about the first axis of rotation with respect to the fluid entry fitting;

wherein the first fluid discharge fitting further comprises a first rotatable valve which is disposed within the first fluid discharge fitting such that rotation of the first rotatable valve modulates the fluid flow rate through the first fluid discharge fitting, and the second fluid discharge fitting further comprises a second rotatable valve which is disposed within the second fluid discharge fitting such that rotation of the second rotatable valve modulates the fluid flow rate through the second fluid discharge fitting.

2. The connector apparatus of claim 1, wherein the first axis of rotation and the second axis of rotation are substantially parallel.

3. The connector apparatus of claim 1, wherein the fluid entry fitting is substantially T-shaped such that the first distribution connector and the second distribution connector have a shared central longitudinal axis, wherein the shared central longitudinal axis is:
perpendicular to a central longitudinal axis of the first end connector; and
substantially parallel to one or more of the first axis of rotation and the second axis of rotation.

4. The connector apparatus of claim 3, wherein the shared central longitudinal axis is perpendicular to one or more of:
a central longitudinal axis of the first discharge connector; and
a central longitudinal axis of the second discharge connector.

5. The connector apparatus of claim 1, wherein one or more of the first rotation member and the second rotation member contain at least one 0-ring in engagement with an inner surface of the first intake connector and the second intake connector, respectively.

6. The connector apparatus of claim 1, wherein:
the first fluid discharge fitting further comprises a first expansion connector; and
the second fluid discharge fitting further comprises a second expansion connector.

7. The connector apparatus of claim 6, further comprising:
a third fluid discharge fitting comprising a third intake connector and a third discharge connector, wherein the third intake connector receives fluid from the first expansion connector;
a third rotation member coupled between the third intake connector and the first expansion connector, such that the third fluid discharge fitting is rotatable about a third axis of rotation with respect to the first fluid discharge fitting;
a fourth fluid discharge fitting comprising a fourth intake connector and a fourth discharge connector, wherein the fourth intake connector receives fluid from the second expansion connector; and
a fourth rotation member coupled between the fourth intake connector and the second expansion connector, such that the fourth fluid discharge fitting is rotatable about a fourth axis of rotation with respect to the second fluid discharge connector.

8. The connector apparatus of claim 7, wherein one or more of the first axis of rotation, the second axis of rotation, the third axis of rotation, and the fourth axis of rotation are substantially parallel.

9. The connector apparatus of claim 7, wherein one or more of the third rotation member and the fourth rotation member:
contains at least one O-ring; and
is rotatable through 360 degrees about the third axis of rotation or the fourth axis of rotation, respectively.

10. The connector apparatus of claim 7, further comprising one or more rotatable hose couplings attached to a respective one or more of the first discharge connector, the second discharge connector, the third discharge connector, and the fourth discharge connector.

11. The connector apparatus of claim 7, further comprising one or more rotatable valves disposed within one or more of the first fluid discharge fitting, the second fluid discharge fitting, the third fluid discharge fitting, and the fourth fluid discharge fitting such that rotation of the one or more rotatable valves modulates the fluid flow rate through a corresponding one of the fluid discharge fittings.

12. The connector apparatus of claim 6, further comprising:
a first plug element removably coupled to the first expansion connector to prevent fluid flow through the first expansion connector; and
a second plug element removably coupled to the second expansion connector to prevent fluid flow through the second expansion connector.

* * * * *